United States Patent

Webb et al.

[11] Patent Number: 5,790,844
[45] Date of Patent: Aug. 4, 1998

[54] MILLICODE LOAD AND TEST ACCESS INSTRUCTION THAT BLOCKS INTERRUPTS IN RESPONSE TO ACCESS EXCEPTIONS

[75] Inventors: Charles Franklin Webb, Poughkeepsie; Mark Steven Farrell, Pleasant Valley; Mark Anthony Check, Hopewell Junction; John Stephen Liptay, Rhinebeck, all of N.Y.

[73] Assignee: International Business Machines Corporation, Armonk, N.Y.

[21] Appl. No.: 829,268

[22] Filed: Mar. 31, 1997

Related U.S. Application Data

[62] Division of Ser. No. 414,154, Mar. 31, 1995, Pat. No. 5,694,587.
[51] Int. Cl.⁶ .................................................. G06F 9/30
[52] U.S. Cl. .......................... 395/568; 395/591; 395/595
[58] Field of Search ........................... 395/385, 386, 395/387, 390, 394, 395, 568, 570, 591, 595, 800.23, 800.41

[56] References Cited

U.S. PATENT DOCUMENTS

| | | | |
|---|---|---|---|
| 5,136,696 | 8/1992 | Beckwith et al. | 395/587 |
| 5,226,164 | 7/1993 | Nadas et al. | 395/385 |
| 5,280,593 | 1/1994 | Bullions, II et al. | 395/384 |
| 5,479,616 | 12/1995 | Garibay, Jr. et al. | 395/388 |
| 5,537,559 | 7/1996 | Kane et al. | 395/591 |
| 5,596,733 | 1/1997 | Worley, Jr. et al. | 395/591 |
| 5,596,739 | 1/1997 | Kane et al. | 395/479 |

*Primary Examiner*—Parshotam S. Lall
*Assistant Examiner*—Viet Vu
*Attorney, Agent, or Firm*—Lane, Aitken & McCann; Lynn L. Augspurger

[57] ABSTRACT

A special inillicode instruction "Load With Access Test" explicitly detects access exceptions for storage operands while retaining control in the current millicode routine to insure exceptions are handled correctly and with the right priority. The millicode Load With Access Test instruction operates similarly to the ESA/390 Load instruction except that access exception code is set, interrupts are blocked and the serialization is forced to purge the instruction pipeline and reset the pipeline control without redirection of the instruction stream.

1 Claim, 3 Drawing Sheets

TEST PSW

TPSW R$_1$, D$_2$, B$_2$    [RS2]

| 'A3' | R1 | 'D' | B2 | D2 |
|---|---|---|---|---|
| 0 | 8 | 12 | 16 | 20    31 |

FIG.2

LOAD AND TEST ACCESS

LTA R$_1$, D$_2$, B$_2$    [RS2]

| 'A2' | R1 | '5' | B2 | D2 |
|---|---|---|---|---|
| 0 | 8 | 12 | 16 | 20    31 |

FIG.4

TRANSLATE FETCH

TRFET R$_1$, M$_3$, X$_2$, B$_2$    [RXX]

| 'A0' | R1 | 'X2' | B2 | ////////// | M3 |
|---|---|---|---|---|---|
| 0 | 8 | 12 | 16 | 20 | 28  31 |

FIG.5

MILLICODE LOAD AND TEST ACCESS INSTRUCTION THAT BLOCKS INTERRUPTS IN RESPONSE TO ACCESS EXCEPTIONS

DESCRIPTION

This application is a division of application Ser. No. 08/414,154 of Charles F. Webb et al., filed Mar. 31, 1995, entitled "Specialized Millicode Instruction", now U.S. Pat. No. 5,694,587.

BACKGROUND OF THE INVENTION

1. Field of the Invention

This invention relates to improvements in pipelined computer processors that execute relatively simple instructions in hardware controlled execution units and execute relatively complex instructions in a milli-mode architected state with vertical microcode (i.e. millicode) routines executing in the same hardware controlled execution units. More particularly, this invention relates to a set of specialized millicode instructions which reduce the number of millicode instructions and machine cycles required to perform certain complex operations that are called relatively frequently.

2. Cross Reference to Related Applications

The present United States patent application is related to the following co-pending United States patent applications which are assigned to the assignee of the present application.

Application Ser. No. 08/414,821 filed Mar. 31, 1995, entitled "Millicode Read-Only Storage With Entry Point Patch Control".

Application Ser. No. 08/414,977, filed Mar. 31, 1995, entitled "Hardware Retry Trap for Millicoded Processor", now U.S. Pat. No. 5,673,391.

Application Ser. No. 02/414,158, filed Mar. 31, 1995, entitled "Addressing Extended Memory Using Millicode", now U.S. Pat. No. 5,680,598.

Application Ser. No. 08/414,812, filed Mar. 31, 1995, entitled "Mapping Processor State Into A Millicode Addressable Processor State Register Array", now abandoned.

Application Ser. No. 08/414,164, filed Mar. 31, 1995, entitled "Linking Program Access Register Number With Millicode Operand Access", now U.S. Pat. No. 5,713,055.

Application Ser. No. 08/414,975, filed Mar. 31, 1995, entitled "Priority and Recovery Method For System Serialization (Quiesce)", now U.S. Pat. No. 5,694,617.

3. Description of the Prior Art

Instruction sets used in computer systems employing so-called Complex Instruction Set Computing (CISC) architecture include both simple instructions (e.g. Load, or Add) and complex instructions (e.g. Program Call, or Load Address Space Parameters). As an example to which the invention has particular relevance, see "IBM Enterprise Systems Architecture/390 Principles of Operation" (Publication Number SA22-7201-02, available from IBM Corporation, Armonk, N.Y.), which is incorporated herein by reference in its entirety. As these computer systems (e.g. IBM System 390) have become more powerful, larger percentages of the instruction set have been implemented using hardware execution units to increase the systems performance. Conventionally, the complex functions are implemented in microcode because building hardware execution units to execute them is expensive and error prone.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

More recently, prior art proposals have been advanced for machines with a so-called milli-mode operating capability; see, for example, IBM Technical Disclosure Bulletin Vol. 35, No. 4A of September 1992, incorporated herein by reference, and U.S. Pat. Nos. 5,280,593 and 5,226,164 assigned to the assignee of this invention and also incorporated herein by reference.

A milli-mode operation enables implementation of complex functions in a large, hardware controlled, pipelined, general purpose digital computer without a microprocessor. Milli-mode implements these complex functions with the flexibility provided by firmware and avoids a packaging problem introduced by the inclusion of microprocessor hardware. Rather than a microprocessor, milli-mode uses the preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in the instruction decode logic detects the requirement to enter milli-mode, and this causes millicode routines to be fetched. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

The hardware-executed instructions which are valid only for millicode are generally of a format and a function similar to those of ESA/390 instructions. In this way, the unique hardware required to implement these instructions is minimized, and the simplicity of the hardware design is maintained. This simplicity of hardware controls is a chief advantage of millicode over other forms of internal code (e.g. microcode) which require considerably more unique hardware.

A disadvantage of a millicoded design is that some complex operations require more internal code instructions and/or more machine cycles than with some forms of microcode. In some cases, this is due to the inefficiency of the base instruction set (e.g. the hardware-executed ESA/390 instructions) when used to perform these complex operations. Depending on the frequency with which these operations are performed, the impact on overall system performance may be significant.

An object of this invention is the provision of a specialized millicode instruction set which reduces the number of millicode instructions and machine cycles required to perform a certain complex operation that is called relatively frequently.

Another object of this invention is the provision of a specialized millicode instruction set which conforms to an instruction format for normal (i.e. non-millicode) operation and which requires a minimum of hardware unique to the specialized set.

Briefly, this invention contemplates the provision of the following specialized millicode instruction sets:

ESA/390 operation requires testing the validity of the Program Status Word (PSW). This ESA/390 test is executed by a special PSW Validity Test millicode routine, which tests the validity of the PSW with three simple millicode instructions, including a special PSW Validity Test instruction. Each of the three instructions can be performed in a single machine cycle.

ESA/390 operation requires testing for access exceptions without taking a program interrupt. This ESA/390 test is executed by a special millicode instruction "Load With Access Test", which explicitly detects access exceptions for storage operands while retaining control in the current millicode routine to insure exceptions are handled correctly and with the right priority. The millicode Load With Access Test instruction operates the same way as the ESA/390 Load instruction except that access exceptions set a condition code rather than cause an interrupt.

The ESA/390 instructions Translate (TR) and Translate and Test (TRT) use a table of 256 bytes to translate a string of bytes. For each of these ESA/390 instructions, each string byte is used as an index into the table, and the selected table byte is fetched. For Translate, the selected table bytes replace the original string in storage. For Translate and Test, the selected bytes are tested, and the first non-zero table byte selected is returned to the program in a general register along with the address of the string byte which selected it; translate and test also sets the condition code, and does not update storage.

To provide reasonable performance on Translate and Translate and Test, while maintaining flexibility and simplicity of a millicoded design, a millicode instruction Translate Fetch (TRFET) is provided specifically for use in execution of the ESA/390 Translate and Translate and Test instructions. This Translate Fetch millicode instruction uses an RX format, but modifies the interpretation of the $X_2$ and $D_2$ fields. Instead of designating a byte offset, the $D_2$ field is used as a 3-bit mask ($M_2$), the remaining bits of $D_2$ being ignored. The low-order 2 bits of this mask select one of the four bytes of the $X_2$ register to use as the actual index (rather than the entire $X_2$ register being used). In addition, the 3-bit mask selects one of the eight bytes of the Millicode General Register (MGR) pair designated by $R_1$ to receive the byte of storage accessed by the operand 2 address. The resulting contents of MGR pair $R_1$ are tested for a non-zero value and the condition code is set accordingly. The only dataflow hardware specifically required for this millicode Translate Fetch instruction is a 4-to-1 byte multiplexer for the $X_2$ input to the address adder.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a pictorial representation of the millicode instruction "Test PSW Validity."

FIG. 4 is a pictorial representation of the millicode instruction "Load With Access Test."

FIG. 5 is a pictorial representation of the millicode instruction "Character Translation Assist."

DETAILED DESCRIPTION OF A PREFERRED EMBODIMENT OF THE INVENTION

This following exemplary embodiment of the invention is applicable in the overall context of a system generally conforming to IBM 390 system architecture. A more detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below. While the System 390 environment will be used as an example, it should be understood that the present invention is also readily applicable to other IBM (e.g. IBM System 370) and non-IBM architectures as well.

While not limited thereto, the invention is particularly well suited for use in conjunction with the enhanced error recovery system described in copending application Ser. No. 08/149,260, filed Nov. 9, 1993, U.S. Pat. No. 5,504,859 assigned to the assignee of this application, and also incorporated herein by reference.

Figure 1:
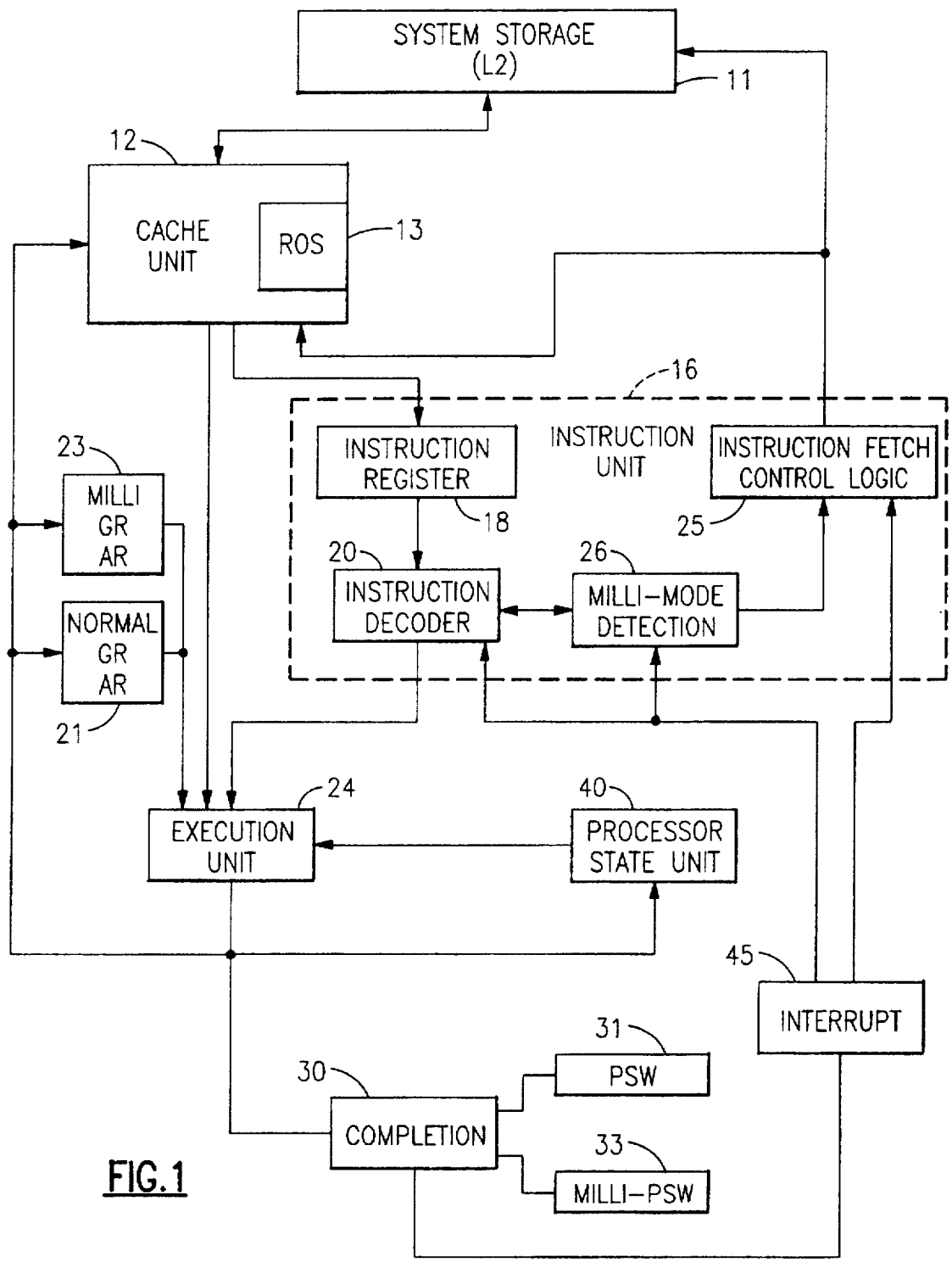
FIG. 1 is a block diagram illustrating the components of a millicode system in accordance with a preferred specific embodiment of the invention.

Referring now to FIG. 1, elements of a system relevant to this invention include a system storage 11, and a cache memory unit 12. The system storage 11 contains the instructions that the processor is executing as well as the data those instructions are manipulating. The cache memory unit 12, which includes a copy of the data and instructions the processor is presently executing, in this preferred embodiment is a cache providing interleaved double word addressing. The cache memory 12 logically includes a contiguously addressable read only store 13, in which code for executing certain frequently invoked milli-mode routines is stored.

An instruction unit subsystem 16 includes an instruction buffer (not shown in FIG. 1), instruction registers 18 and an instruction decoder 20. The instruction unit subsystem receives macro-instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro-code instruction execution and to a set of general purpose registers and access registers 23 for millicode instruction execution. Control logic controls the exchange of data between the two sets of registers when beginning or terminating a millicode routine.

Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 25 and places the decoder 20 into a milli-mode operating state. In this state the decoder is enabled to decode milli-mode instructions. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers. A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation.

Milli-mode is enabled when the milli-mode detection logic 26 recognizes that the macro-instruction being decoded is to be implemented with millicode. In response to this recognition, the detection logic 26 signals the decoder 20, the instruction fetch controls 35 and register controls in the execution unit 24. In response to the milli-mode recognition signal from the detection logic 26, the decoder 20 suspends macro-mode decoding, the execution unit register control copies the contents of the GPRs 21 to the milli-registers 23 and causes the system to subsequently use the milli-registers 23. The milli-mode detection logic 26 generates a millicode entry point address.

The entry point address (generated by the milli-mode detection logic 26) is used by the control logic 35 to address the cache 12. Milli-instructions from the cache are sent to the instruction registers 18 where the decoder 20 decodes them and schedules them for execution.

When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro-instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to begin completing macro-instructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a MEND milli-instruction. This causes the decoder to stop decoding in milli-mode. Depending on whether or not there are additional interrupts that require servicing, the decoder hardware will either redo the interrupt process or return to decoding macro-instructions from the cache.

PSW Validity Test

In many cases, millicode must load a new value into the PSW or otherwise alter the PSW value. For example after the execution of a millicode routine, the processor may be required to execute program statements other than the ones immediately following the macro instruction before the processor entered the millicode routine. When this happens, the ESA/390 architecture requires that the new PSW value be checked for validity. If the new PSW value is not valid, the ESA/390 architecture further requires that a specification exception be reported.

For an ESA/390 PSW to be valid, all of the following must be true:

1. Bit 12 is set to 1.
2. Bit 63 is set to 0 (instruction address must be even).
3. Bit 32 is set to 1 (31-bit addressing mode). OR
   Bits 32:39 are all 0 (valid 24-bit instruction address).
4. Bits 0, 2:4, and 24:31 are all set to 0.

Additionally, some operational modes further restrict the PSW. For example, some modes require that the Dynamic Address Translation Control (bit 5) is set to 0 Or that the Address Space Control 15 is set to Primary or Access Register Mode (i.e. bit 16 is set to 0). The overall complexity of PSW validity testing, along with the possibility of architecture changes, argue against a strictly hardware implementation of PSW validity testing. However, a millicoded check of PSW validity, with no special millicode instructions, would require several tests and branches, resulting in a significant performance impact.

Referring now to FIG. 2, to avoid these problems, a millicode instruction, TEST PSW, is defined as illustrated to support efficient PSW validity checking under millicode control. The instruction tests bits 0:31 of the PSW using a mask which, the millicode supplies. The instruction separately tests bit 12 and bits 32:63 (the instruction address) using hardware controls. The instruction can use hardware controls for these latter tests since these bits are independent of operational modes.

A special test is performed using the specified processor state unit register, the MGR specified by $R_1$ and the program instruction address, and the result of the test is indicated in the condition code. Neither the specified processor state unit register nor MGR $R_1$ is modified by this instruction. The operand 2 address (specified by $D_2(B_2)$) is not used to address storage. Instead, bits 24:31 of the address are used to select one register from the processor state unit. Bits 0:23 of the operand 2 address are ignored. This instruction is intended for use with 32-bit processor state unit registers.

The expected use of this instruction is with a register containing the current ESA/390 PSW specified as the processor state unit register.

The test performed is designed to check the ESA/390 PSW for validity, under control of millicode. The 32-bit value contained in MGR $R_1$ is used as a mask to indicate which bits in the specified processor state unit register are required to be zeros. Note that the appropriate value for the mask is affected by various operational modes, including those associated with multiple-controlled data spaces and the expedited SIE subset. If the bitwise logical AND of MGR $R_1$ and the specified processor state unit register is not all zeros, then condition code 1 is set to indicate an invalid PSW format. Independently of the mask value in MGR $R_1$, if bit 12 of the specified processor state unit register is zero, condition code 1 is set, since this cannot be a valid 370/XA or ESA/390 PSW.

The program instruction address is also examined by the hardware. If the bit 0 of the address is zero (indicating 24-bit addressing mode) and bits 1:7 are not all zeros, condition code 1 is set. If bit 31 of the address is 1 (odd instruction address), and no conditions exist to set condition code 1, then condition code 2 is set.

If no conditions exist to set condition code 1 or 2, then condition code 0 is set.

This instruction is provided to accomplish in one execution cycle what would otherwise require several millicode instructions. It remains the responsibility of millicode to load the correct mask value in MGR $R_1$ and to take the appropriate action if the PSW is indeed invalid.

The condition code is set as follows:

| Code | Condition |
| --- | --- |
| 0 | Valid PSW value |
| 1 | Invalid PSW (word 0 or addressing mode) |
| 2 | Odd instruction address |

Figure 3:
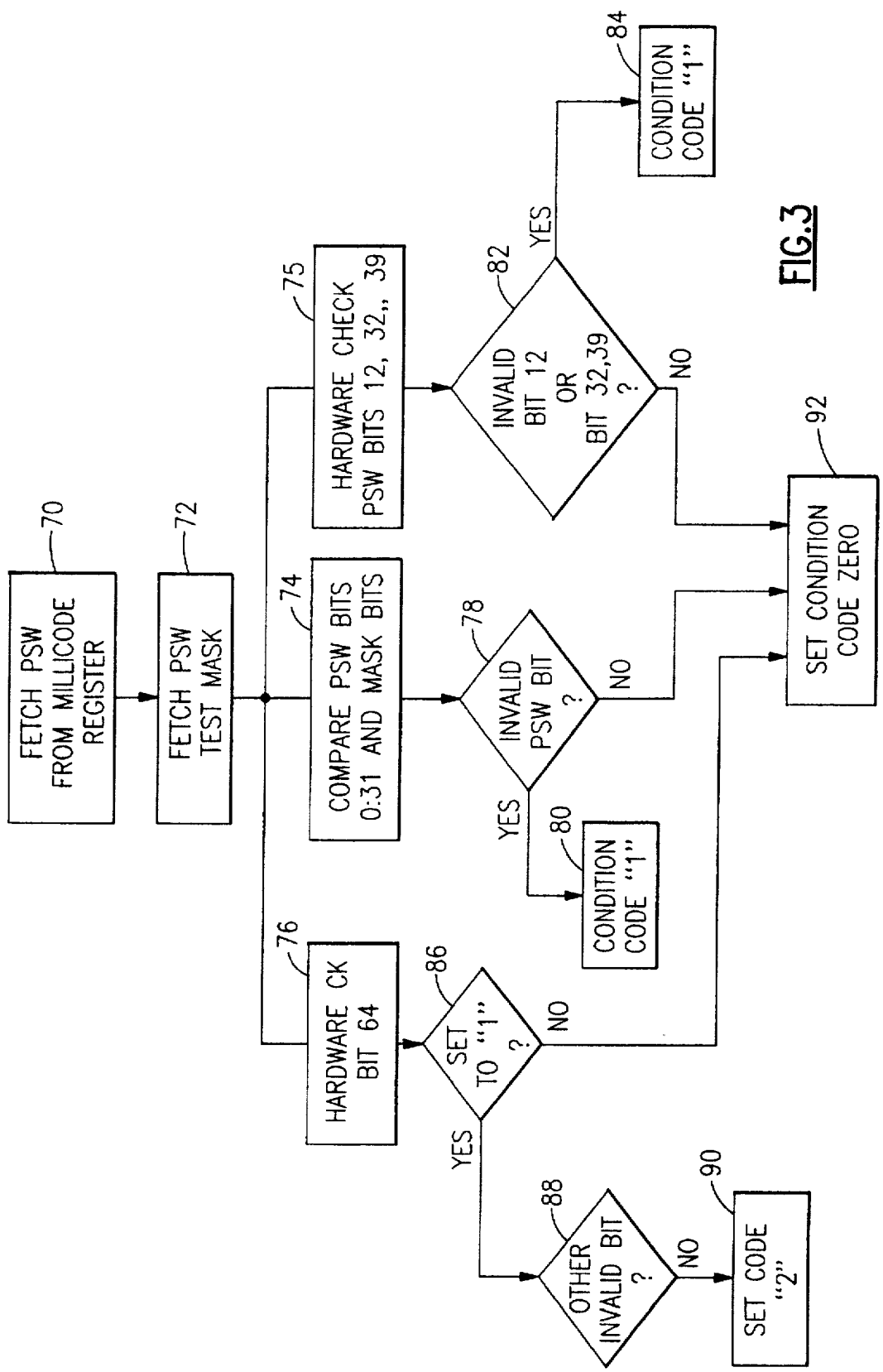
FIG. 3 is a flow chart of the millicode program status word validity test operation.

Referring now to FIG. 3, in operation, the millicode instruction references the PSW from the special register (a Millicode Control Register) in which the PSW is maintained, block 70. This avoids any need to access the PSW separately from the TEST PSW instruction. Independently of the TEST PSW operation, millicode computes the mask for the TEST PSW instruction whenever the operational mode changes. The processor maintains this mask in a register or storage to allow fast access when needed for TEST PSW. Prior to execution of TEST PSW, this mask is loaded into an MGR, from which the TEST PSW obtains the mask value, block 72. The processor defines the mask such that it contains a 1 in every bit position required to be a 0 in the PSW.

TEST PSW consists of a logical AND of the mask with bits 0:31 of the PSW, block 74, and a hardware check of bits 12, 32:39, block 75, and bit 64, block 76. The processor sets the condition code to 1 if any of these conditions exist: (1) the result of this logical AND is not all zeros indicating that a PSW bit required to be 0 is in fact a 1, blocks 78 and 80; (2) PSW bit 12 is 0; or (3) PSW bits 32:39 contain an invalid combination, blocks 82 and 84. Furthermore, if PSW bit 63 is set to 1, and the instruction finds no other invalid PSW condition, then the instruction sets the condition code to 2, blocks 86, 88 and 90. If none of the preceding occurs, the instruction sets the condition code to 0 to indicate a valid PSW, block 92.

Load With Access Test

Millicode statements, just like hardware executed ESA/390 macrocode instructions, are subject to access exception tests. That is, if millicode accesses a storage operand and an exception occurs, the interrupt logic interrupts the millicode routine and passes control to the program exception interrupt handler.

In many cases, millicode must explicitly detect access exceptions for storage operands while at the same time retaining control in the current millicode routine to ensure that exceptions are handled correctly and with the right priority. The system has a LOAD AND TEST ACCESS millicode instruction illustrated in FIG. 4 to meet this requirement with the addition of minimal unique hardware.

The MGR specified by $R_1$ is loaded with the word of storage addressed by $D_2(B_2)$. Access exceptions associated with the storage access for the second operand are blocked in the hardware, and do not result in a program interrupt, but instead set the condition code. In addition, the value loaded in the MGR is unpredictable when an access exception other than a protection exception is detected. In all other respects this operates like the ESA/390 LOAD instruction.

If the test modifier tag is set in the operand access control register used with LOAD AND TEST ACCESS, the processor will check for store access exceptions as well as for fetch access exceptions. The accessed data is still returned and the condition code set as for an unmodified LOAD AND TEST ACCESS instruction.

The millicode condition code is set to indicate whether any access exception conditions were present for the second-operand storage access, as follows:

| Code | Condition |
| --- | --- |
| 0 | No access exceptions found |
| 1 | Access exception found and blocked |
| 2 | <not used> |
| 3 | Host access exception found and blocked |

This instruction operates similarly to the ESA/390 LOAD instruction. The difference between the ESA/390 LOAD instruction and the LOAD AND TEST ACCESS instruction is that with the LOAD AND TEST ACCESS instruction, the access exceptions do not cause an interrupt but instead set a condition code. In particular, the instruction sets the condition code to 0 if no access exception is detected, and sets it to either 1 or 3 if the instruction detects an access exception. The instruction sets the condition to 3 when the program is executing in emulation and the access exception is associated with the host program. The instruction sets the condition code to 1 for all other access exceptions.

Hardware suppresses reporting of these access exceptions and uses the access exception information to set the condition code. The additional hardware introduces no timing or performance constraints since access exception information is available with the same timing as the data being retrieved.

Except for the interrupt controls, to which the storage access controls transfer access information, and the condition code controls, the LOAD AND TEST instruction does not affect the hardware controls associated with storage accesses and access exceptions. In order to ensure that these controls are not left in a state that expects a program interruption due to the access exception, the interrupt controls will force a serialization interrupt if a non-zero code is set for LOAD AND TEST ACCESS. This serialization interrupt purges the instruction pipeline and resets the pipeline controls, but does not cause any redirection of the instruction stream and thus is completely transparent to the millicode being executed. Since this serialization interrupt occurs only in the access exception case, which should be relatively infrequent, the performance impact of this is negligible.

Character Translation Assist

The ESA/390 instructions TRANSLATE and TRANSLATE AND TEST use a table of 256 bytes to translate a string of bytes. The instruction uses each string byte as an index into the table and then selects and fetches a table byte. The table bytes selected by TRANSLATE replaced the original string in storage. For TRANSLATE AND TEST, the selected bytes are tested, and the first non-zero table byte selected is returned to the program in a general register along with the address of the string byte which selected it. TRANSLATE AND TEST also sets the condition code, but it does not update storage.

Millicode can implement these instructions using only standard ESA/390 instructions, but the sequence of extracting a string byte, accessing the table using that byte as an index, and either testing the table byte or storing it back to the string would require several machine cycles per byte processed. Since these instructions are used extensively in many applications, the implementing of these instructions in only standard ESA/390 instructions would significantly impact performance. A hardware implementation of these instructions would require complex controls.

The millicode instruction TRANSLATE FETCH, illustrated in FIG. 5, helps provide reasonable performance to TRANSLATE and TRANSLATE AND TEST instructions while maintaining the flexibility and simplicity of a millicoded design. The TRANSLATE FETCH instruction uses an RX format, but modifies the interpretation of the $X_2$ and $D_2$ fields (base and displacement). Instead of designating a bit offset, bits 29 to 31 of the instruction are used as a 3-bit mask and the remaining bits of what is normally the $D_2$ field in an RX format instruction are ignored. The low order 2 bits of this mask select one of the four bytes of the $X_2$ register to use as an actual index. Additionally, the 3-byte mask selects one of the 8 bytes of the millicode general register pair designated by R1 to receive the byte of storage accessed by the operand 2 address. The resulting contents of MGR Pair $R_1$ are tested for a non-zero value and a condition code is set accordingly. The only unique data flow hardware required for TRANSLATE FETCH is the 4-to-1 bit multiplexer for the $X_2$ input to the address adder.

A single byte is fetched from storage at the operand 2 address and inserted into the even/odd MGR pair specified by $R_1$.

The operand 2 address is not formed by the normal $B_2+X_2+D_2$ process; instead, bits 30:31 of the instruction select one of four bytes from MGR $X_2$, and that byte is added to the contents of MGR $B_2$ to form the operand address. Similarly, bits 29:31 of the instruction select which byte of the MGR pair ($R_1$, $R_1$ +1) is loaded with the byte fetched from storage. The effect of the $M_3$ field (bits 29:31 of the instruction) is summarized in Table 1.

TABLE 1

| | Effect of $M_3$ field in TRFET instruction | |
|---|---|---|
| $M_3$ | Operand 2 address | Register byte loaded |
| '000'b | $B_2 + X_2.0:7$ | $R_1.0:7$ |
| '001'b | $B_2 + X_2.8:15$ | $R_1.8:15$ |
| '010'b | $B_2 + X_2.16:23$ | $R_1.16:23$ |
| '011'b | $B_2 + X_2.24:31$ | $R_1.24:31$ |
| '100'b | $B_2 + X_2.0:7$ | $(R_1 + 1).0:7$ |
| '101'b | $B_2 + X_2.8:15$ | $(R_1 + 1).8:15$ |
| '110'b | $B_2 + X_2.16:23$ | $(R_1 + 1).16:23$ |
| '111'b | $B_2 + X_2.24:31$ | $(R_1 + 1).24:31$ |

Bits 20:28 of the instruction are not used.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. In a pipelined computer processor, which executes pipelined instructions, including a relatively simple instruction set in a hardware controlled execution unit and executes a relatively complex instruction set in a milli-mode architected state with a millicode sequence of simple instructions in said hardware controlled execution unit, a millicode method for loading operands and testing for access exceptions while retaining millicode control of the operation, including the steps of:

storing a millicode load and test access instruction that includes a field specifying a millicode register address and a field specifying a storage address for an access exception to a second operand fetch access exception;

fetching said millicode load and test access instruction;

testing a load operand operation;

setting one condition code when no access exception is found;

blocking an interrupt when an access exception is found and setting another condition code;

forcing a serialization in response to said another condition code to purge the instruction pipeline and reset a pipeline control without redirection of the instruction stream.

* * * * *

UNITED STATES PATENT AND TRADEMARK OFFICE
CERTIFICATE OF CORRECTION

PATENT NO. : 5,790,844
DATED : August 4, 1998
INVENTOR(S) : Charles Franklin Webb et al.

It is certified that error appears in the above-identified patent and that said Letters Patent is hereby corrected as shown below:

In the Abstract [57] line 1, delete " inillicode" and insert -- millicode --

Signed and Sealed this

Fourth Day of May, 1999

Attest:

Attesting Officer

Q. TODD DICKINSON

Acting Commissioner of Patents and Trademarks